United States Patent
Foucher et al.

(10) Patent No.: US 9,815,152 B2
(45) Date of Patent: Nov. 14, 2017

(54) FRICTION STIR WELDING: METHOD AND DEVICE FOR FILLING A HOLE AT THE END OF WELDING OR FOR REPAIRING A WELDING DEFECT

(71) Applicant: AIRBUS GROUP SAS, Blagnac (FR)

(72) Inventors: Gilles Foucher, Chatillon sous Bagneux (FR); François Marie, Rueil Malmaison (FR); Daniel Aliaga, Bron (FR)

(73) Assignee: AIRBUS, Blagnac (FR)

( * ) Notice: Subject to any disclaimer, the term of this patent is extended or adjusted under 35 U.S.C. 154(b) by 0 days.

(21) Appl. No.: 15/051,374

(22) Filed: Feb. 23, 2016

(65) Prior Publication Data
US 2016/0250727 A1    Sep. 1, 2016

(30) Foreign Application Priority Data

Feb. 26, 2015 (EP) .................................. 15156759

(51) Int. Cl.
*B23K 20/12* (2006.01)
*B23P 6/04* (2006.01)
(Continued)

(52) U.S. Cl.
CPC .............. *B23P 6/04* (2013.01); *B23K 20/124* (2013.01); *B23K 20/128* (2013.01);
(Continued)

(58) Field of Classification Search
CPC ....................................... B23K 20/122–20/129
(Continued)

(56) References Cited

U.S. PATENT DOCUMENTS 5,713,507 A * 2/1998 Holt .................... B23K 20/125
228/112.1
5,971,252 A * 10/1999 Rosen ................ B23K 20/1265
228/112.1
(Continued)

FOREIGN PATENT DOCUMENTS

CN    102500915 B * 6/2014
IN    201100925 I2 * 1/2013
(Continued)

OTHER PUBLICATIONS

Machine translation of JP-2012-196680A (no date available).*

*Primary Examiner* — Kiley Stoner
(74) *Attorney, Agent, or Firm* — IM IP Law; C. Andrew Im

(57) ABSTRACT

A method for repairing a defect affecting a weld. A sheet of filler metal is placed on the surface of the welded part, next to the region of the defect. The sheet is locally welded to the welded part in the region of the defect using a friction stir welding tool having a retractable welding pin. The welded part and the sheet are separated such that the filler metal amalgamated with the metal of the welded part remains in position. The local welding operation includes successively performing the following: setting the welding tool into rotation and putting it under pressure; inserting the pin to a small distance from the anvil while maintaining or increasing the pressure on the shoulder of the welding tool; progressively retracting the pin while maintaining or increasing the pressure on the shoulder; and stopping the pressure on the shoulder when the retractable pin has been retracted.

5 Claims, 3 Drawing Sheets

(51) Int. Cl.
*B23P 6/00* (2006.01)
*B23K 20/22* (2006.01)

(52) U.S. Cl.
CPC .......... *B23K 20/1265* (2013.01); *B23K 20/22* (2013.01); *B23P 6/00* (2013.01)

(58) Field of Classification Search
USPC ................................................ 228/112.1, 2.1
See application file for complete search history.

(56) References Cited

U.S. PATENT DOCUMENTS

| | | | | |
|---|---|---|---|---|
| 8,006,890 | B2 * | 8/2011 | Okamoto | B23K 20/126 228/2.1 |
| 2003/0042292 | A1 * | 3/2003 | Hatten | B23K 20/128 228/112.1 |
| 2005/0242158 | A1 * | 11/2005 | Bolser | B23K 20/1265 228/112.1 |
| 2005/0279810 | A1 | 12/2005 | Stol et al. | |
| 2006/0086775 | A1 * | 4/2006 | Trapp | B23K 20/1255 228/112.1 |
| 2007/0119906 | A1 * | 5/2007 | Mika | B23K 20/1245 228/112.1 |
| 2008/0006677 | A1 * | 1/2008 | Kumagai | B23K 20/125 228/101 |
| 2008/0029581 | A1 * | 2/2008 | Kumagai | B23K 20/1255 228/101 |
| 2009/0068492 | A1 * | 3/2009 | Fujii | B23K 9/173 428/615 |
| 2010/0252169 | A1 * | 10/2010 | Feng | B23K 20/1225 156/73.5 |
| 2011/0180587 | A1 * | 7/2011 | Trapp | B23K 20/1225 228/2.1 |
| 2012/0211548 | A1 | 8/2012 | Clark et al. | |
| 2012/0279442 | A1 * | 11/2012 | Creehan | B23K 20/1225 118/76 |
| 2013/0032630 | A1 | 2/2013 | Wang et al. | |
| 2015/0030379 | A1 * | 1/2015 | Lancaster-Larocque | C23C 24/04 403/267 |
| 2015/0183053 | A1 * | 7/2015 | Kumagai | B23K 20/1265 228/112.1 |

FOREIGN PATENT DOCUMENTS

| | | | | |
|---|---|---|---|---|
| JP | 2000 042781 | A | | 2/2000 |
| JP | 2006167793 | A * | | 6/2006 |
| JP | 2010 269367 | A | | 12/2010 |
| JP | 2012 196680 | A | | 10/2012 |
| JP | 2014054672 | A * | | 3/2014 |
| JP | 5685461 | B2 * | | 3/2015 |
| KR | 100765843 | B1 * | 10/2007 | .............. B21J 15/02 |
| KR | 101278097 | B1 * | 6/2013 | |
| KR | 20140026761 | A * | 3/2014 | |

* cited by examiner 2-a
(Top View)

2-b
(Section A-A)

FRICTION STIR WELDING: METHOD AND DEVICE FOR FILLING A HOLE AT THE END OF WELDING OR FOR REPAIRING A WELDING DEFECT

RELATED APPLICATIONS

This application claims priority from European Patent Application No. EP15156759.1 filed Feb. 26, 2015, which is herein incorporated by reference in its entirety.

FIELD OF THE INVENTION

The invention relates to the general field of friction stir welding, or FSW. The FSW technique is being used increasingly for welding metal structures and more particularly structures made of aluminium alloys.

The invention deals more particularly with the problem of repairing welds that are made by such a technique and have defects and also with the problem of reworking defects that can appear in the end region of a weld.

BACKGROUND OF THE INVENTION

In conventional FSW welding, the tool leaves an impression in the material, at the end of the weld line, said impression generally being made up of a hole having the same geometry as the pin, this constituting a prohibitive defect which has to be remedied.

In FSW welding, various types of tool can be used:
Conventional tools and tools with a double shoulder, or "bobbin tools", which leave a hole at the end of welding.
Tools with a retractable pin which can avoid the formation of a hole at the end of welding by carrying out progressive retraction of the pin over a significant distance from the end of welding. The French patent application filed by the applicant and published under the reference FR 2900082 describes notably a method implementing such a tool.

Welding operations with conventional tools or bobbin tools are disadvantaged by the presence of the abovementioned impression at the end of the weld line, this impression frequently requiring the provision of a guard zone, in which the weld line ends, on the parts to be welded, said guard zone being intended to be eliminated so as to give the assembled parts their final dimensions and shape. Such a welding method thus leads to the execution of repeat machining of the welded parts and necessarily to the production of scrap, thereby increasing the assembly costs.

Furthermore, repairing welding defects that can appear along the weld line is not easy to carry out, and so sometimes some assemblies have to be scrapped because it is not possible to carry out satisfactory reworking.

For its part, welding with a retractable pin is more tricky to carry out. The tool used notably has to have a pin with a virtually cylindrical geometry. Since the welding operation also comprises an operation of progressive retraction of the pin at the end of the weld line, the tool employed is necessarily more complex in its design and is also more fragile.

It should also be noted that repairing welding defects along the weld line, holes or fissures, necessarily results in an underthickness of material in the region of the repair.

With regard more precisely to the repair or repeat of poorly executed welds at certain points on the weld line, regardless of the welding method used, it is also known to use friction plug welding methods that consist mainly in introducing an addition of material at the flaw, said addition of material forming a plug, and in friction welding this material to already assembled parts. This technology requires both the removal of the welding tool and repeat machining (or resurfacing) of the two faces of the weld. Moreover, it is necessary to have a specific appliance for implementing such a method.

OBJECT AND SUMMARY OF THE INVENTION

One aim of the invention is to propose a solution that makes it notably possible, in the case of friction stir welding using a conventional tool, with a single shoulder or double shoulder for example, to solve the problem of the appearance of an impression (trench, hole) at the end of the weld line.

Another aim of the invention is to propose a solution that makes it possible, notably in the same context, to rework or repair a weld having defects along the weld line, these defects being able to be holes resulting from the removal of defects or tool breakage.

Another aim of the invention is to propose a solution that makes it possible, notably in the same context, to close a circular or circumferential weld.

To this end, the subject of the invention is a method for closing a hole or for repairing a weld by means of a retractable-pin tool and a supplementary addition of material.

More specifically, the subject of the invention is a method for reworking a defect affecting a weld, said method comprising:
  a first step of placing a sheet of filler metal in the region of the defect, said sheet being placed on the surface of the welded part next to the region of the defect;
  a second step of locally welding the sheet of filler metal to the welded part, the welding being carried out in the region of the defect with the aid of a friction stir welding means comprising a retractable welding pin;
  a third step of separating the welded part and the sheet of filler metal, the separation being carried out such that it leaves the filler metal in place in a manner amalgamated by welding with the metal of the welded part.

According to one feature of the method according to the invention, the second step of local welding comprises the following successive operations of:
  setting the retractable-pin tool into rotation and putting it under pressure;
  inserting the retractable pin to a small distance (a few hundred μm) from the backing bar (i.e. from the anvil) while maintaining or increasing the pressure on the shoulder;
  progressively retracting the retractable pin while maintaining or increasing the pressure on the shoulder;
  stopping the pressure on the shoulder when the pin has been retracted from the top of the part.

According to another feature of the method according to the invention, the third, separating step is carried out at the end of execution of the welding step, by imparting a movement on the sheet of filler metal in the plane of the part before the rotation stops.

According to another feature of the method according to the invention, the operation of inserting the retractable pin is accompanied by insertion of the shoulder, the insertion of the shoulder being carried out at a rate of movement much slower than that of the retractable pin.

According to another feature of the method according to the invention, the operation of inserting the retractable pin is accompanied by a continuous orbital movement of said pin.

According to another feature of the method according to the invention, said method also comprises an additional fourth step of renewing the surface state of the welded part in the reworked region.

BRIEF DESCRIPTION OF THE DRAWINGS

The features and advantages of the invention will be better appreciated from the following description, which is based on the appended figures, in which.

It should be noted that, in the various figures, identical elements are provided with the same reference signs.

DETAILED DESCRIPTION OF THE EMBODIMENTS

The operating principle of the method according to the invention consists, after welding, either in order to plug the end-of-welding hole situated at the end of the weld line or to repair a region of the weld line that has a defect, in carrying out a supplementary addition of metal in the region in question. This addition is realized by means of a sheet of filler metal that is placed against the welded part in question such that it covers the region of the weld line that has the defect to be repaired.

The addition of metal as such is carried out by locally welding the sheet of filler metal to the assembled part in the region of the weld line at the location of the defect.

Regardless of the welding technique that is used to produce the weld in question, local welding of the sheet of filler metal is for its part carried out by friction stir welding. However, the tool used is in this case a retractable-pin tool.

Next, once the filler metal is joined to the welded part, a sheet of filler metal is separated from the part.

The method according to the invention is preferably used in the scope of welds that are produced by friction stir welding using conventional tools with a single shoulder or double shoulder ("bobbin tools").

These tools specifically have the drawback of causing the systematic formation of a hole or at least of a trench at the end of the weld line. Moreover, the method according to the invention advantageously makes it possible to repair any imperfections, cavities or bondings that are located along this same line.

In the rest of the description, and for reasons of clarity and ease of explanation, the method according to the invention is presented in the context of an operation of reworking a weld produced by means of a conventional tool with a single shoulder, the welded part being kept in place against an anvil or backing bar.

This presentation of the invention, illustrated in FIGS. 1 to 5, is given by way of example so as to highlight the features of the method according to the invention. It is in no way intended to restrict the scope or extent of the invention to this single application.

Figure 1:
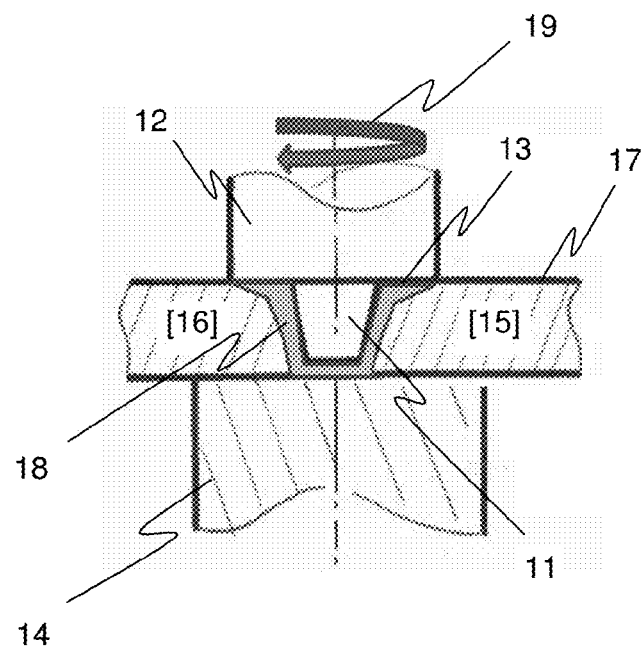
FIGS. 1 and 2 show illustrations highlighting the problem posed by friction stir welding.
Figure 2:
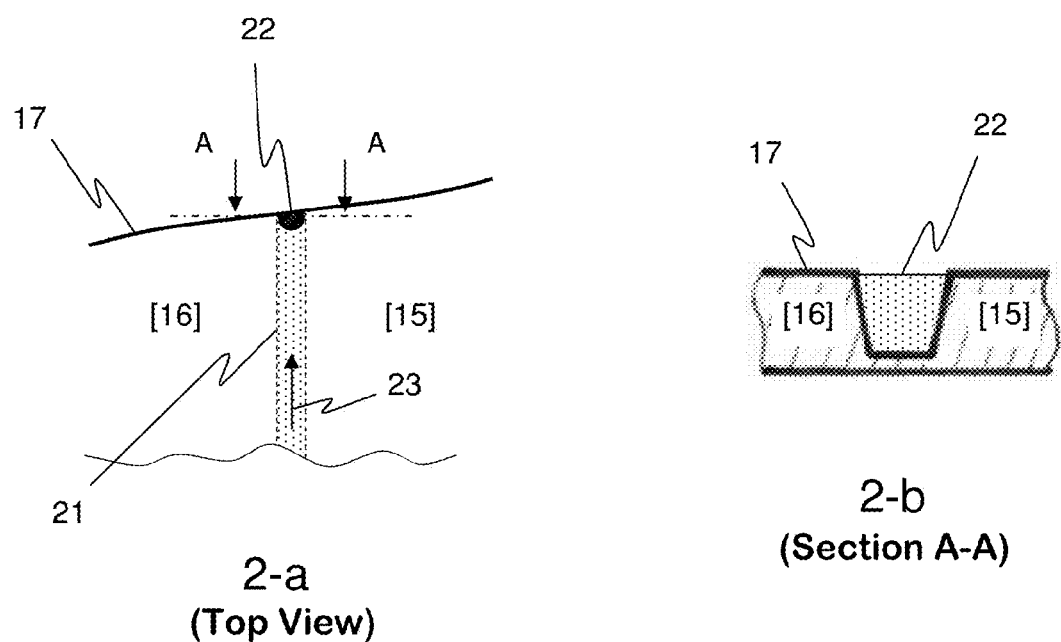

The illustrations in FIGS. 1 and 2 schematically show the problem systematically encountered when producing a welded part 17 by the friction stir welding of two parts 15 and 16 by means of a conventional one-piece tool comprising a welding pin 11 that is mounted in a secure manner on the end of the body 12 of the tool and defines a shoulder 13.

According to a known principle, with the tool being rotated, as indicated by the arrow 19, and driven in translational movement, it is positioned such that the pin passes into the thickness of the metal constituting the parts 15 and 16 to be welded, the shoulder 13 being positioned against the surface of these parts. Thus, by friction, the metal constituting the parts 15 and 16 to be assembled is progressively plasticized through the entire thickness of the parts in the region 18 in which the pin 11 penetrates.

When the tool is a tool with a single shoulder, it should be noted that an anvil 14, or backing bar, is positioned against that surface of the parts 15 and 16 that is not in contact with the tool, such that the pressure applied by the tool does not deform the parts. In the case of a tool with a double shoulder, the function fulfilled by the anvil 14 is replaced by the second shoulder placed against the opposite face.

Next, with the tool being driven in translational movement, as indicated by the arrow 23 in illustration 2-a of FIG. 2, the plasticizing of the metal propagates gradually so as to form a weld line 21, the space left progressively free by the pin after it has passed through being filled with the plasticized metal. However, the stopping of the tool at the end of the weld line 21 and its removal from the top of the surface of the welded part 17 thus obtained generally causes the creation of a region 22 that is not filled with the plasticized metal, this region, which is visible in cross section in illustration 2-b of FIG. 2, having the form of a trench, or a hole, that has more or less the hollowed-out shape of the pin 11. This region 22 constitutes a structural defect which has to be remedied.

In addition to this systematic problem of the appearance of a hole at the end of the weld line, it is also possible to see the appearance of defects of the cavity or tunnel type or bondings (or instances of a lack of connection) along the weld line or else cracks for fusion welding methods.

Figure 3:
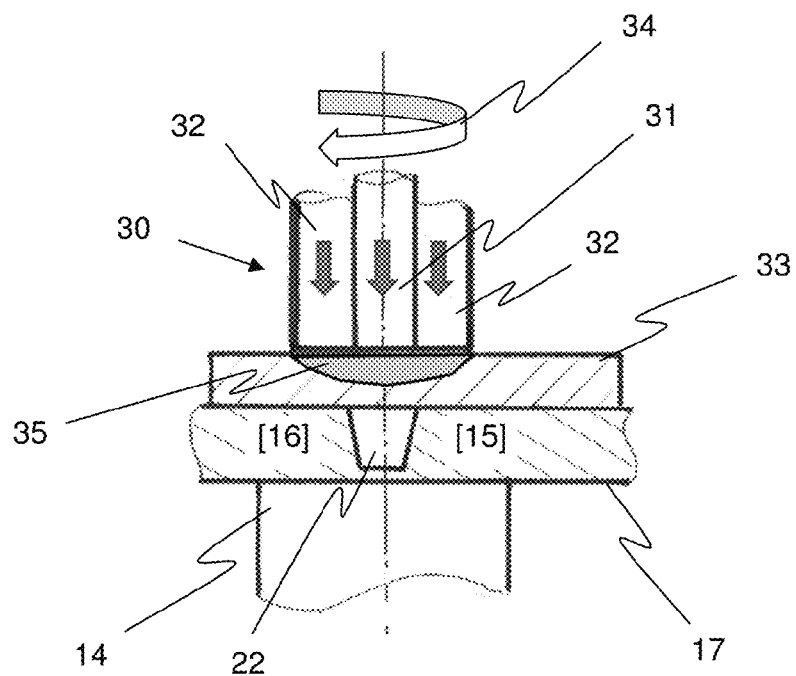
FIG. 3 shows a schematic view illustrating the first step in the method according to the invention.
Figure 4:
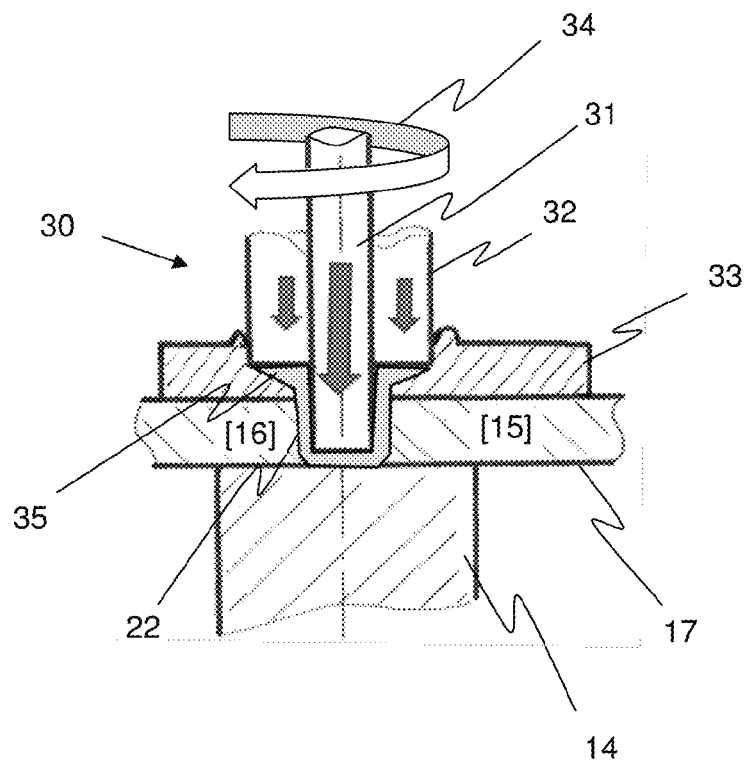
FIG. 4 shows a schematic view illustrating the second step in the method according to the invention.
Figure 5:
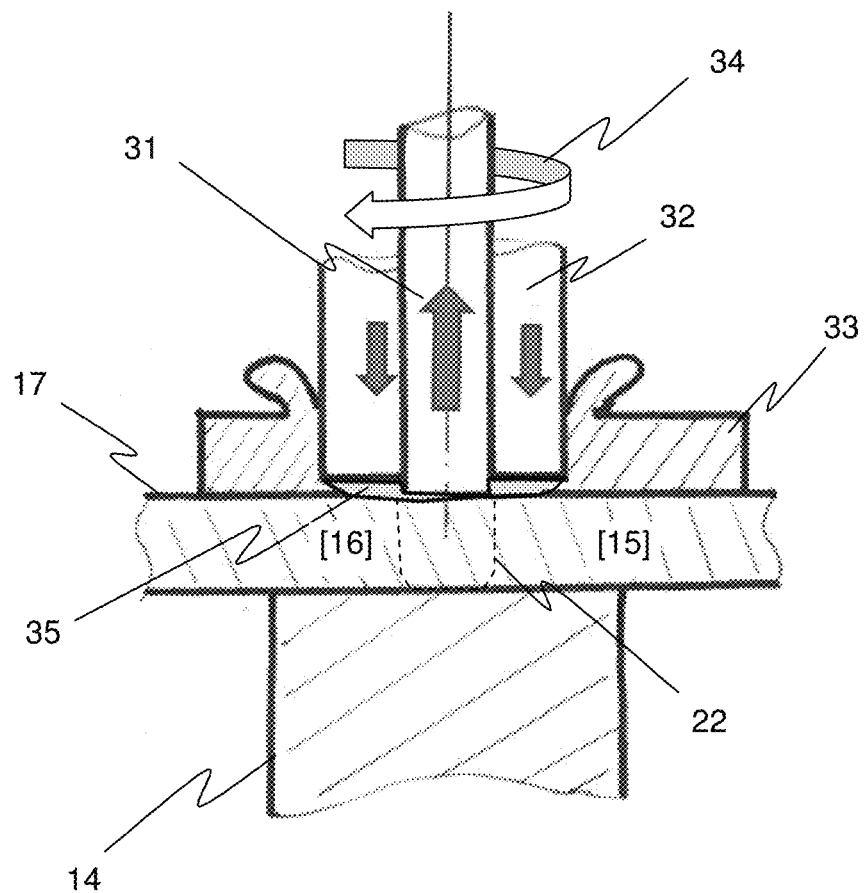
FIG. 5 shows a schematic view illustrating the third step in the method according to the invention.

The illustrations in FIGS. 3 to 5 likewise schematically present the principle of implementing the method according to this invention, this method making it advantageously possible to remedy these defects.

The method according to the invention consists of a preliminary phase of positioning a friction stir welding tool 30, as illustrated in FIG. 3, in the region in which the weld is to be renewed (region of the defect), said friction stir welding tool 30 comprising a retractable pin 31 that can move freely in translation with respect to the body 32 of the tool, such that the end of the pin 31 can either be retracted into the body 32, be in the same plane as the end of the body of the tool, as illustrated in FIG. 3, or protrude from this end, as illustrated in FIG. 4. In this last case, the end of the body 32 constitutes a shoulder with respect to the pin 31. In the rest of the text, by extension, the body 32 is also referred to as shoulder.

In the case of a friction stir welded part, the method according to the invention is preferably implemented when the part is still held in place, clamped in abutment against the backing bar (anvil). Otherwise, the part should be held in place during this preliminary phase by any appropriate means that is otherwise known and not specified here.

Once this preparatory phase has been completed, the method according to the invention then consists in implementing the following steps:

a first step of placing a sheet 33 of filler metal in the region of the defect, said sheet being placed on the surface of the welded part 17 next to the region of the defect, in such a way that said sheet is interposed between this surface and the end of the welding tool 30;

a second step of locally welding the sheet 33 of filler metal to the welded part, the welding being carried out with the aid of the friction stir welding means 30 comprising a retractable pin;

a third step of separating the welded part 17 and the sheet 33 of filler metal, the separation being carried out such that it leaves the filler metal 35 in place in a manner amalgamated by welding with the metal of the welded part 17.

The implementation of the second step consists firstly in setting the retractable-pin tool in rotation and then in positioning the head of the tool, in the region of the defect, against the surface of the sheet 33, by applying a force to the two parts of the tool, namely the pin 31 and the shoulder 32, the ends of the pin 31 and of the shoulder 32 being situated in a single plane. A friction region 35 at the surface of the sheet 33 is thus formed, as illustrated in FIG. 3, the friction setting the metal in motion and ensuring that it plasticizes.

Secondly, the pin 31, which is free to move in translation, is then inserted progressively into the material constituting the sheet 33 until it passes through said sheet and penetrates into the welded part 17 at the location of the defect (hole, trench or simple defect), the pressure on the shoulder 32 being maintained, or increased, so as to ensure that the filler metal plasticizes. The pin 31 carries along with it the metal that has been plasticized and is located around the pin 31 in the trench 22, as illustrated in FIG. 4.

The insertion of the pin is continued to a small distance (a few hundred $\mu m$) from the backing bar (i.e. from the anvil) 14 such that, when the defect in question does not consist of a hole but of some other defect, a trench or the like, the pin produces, in the region of the defect, a trench having a depth very slightly less than the thickness of the welded part.

Thirdly, as is illustrated in FIG. 5, the pin 31 is retracted progressively into the shoulder 32 while the pressure on the shoulder is maintained or even increased such that the volume of plasticized metal is at least sufficient to fill the trench 22, the volume of which is freed by the retraction of the pin 31.

According to the invention, the maximum insertion of the shoulder 32 into the thickness of the sheet 33, during the second and third steps, is determined such that said shoulder 32 does not pass through the sheet and does not come into contact with the part 17. Preferably, it is determined such that the backing surface remains a certain distance from the face of the sheet in contact with the part 17 so as to limit the welding of the sheet 33 to the surface of the part 17. The rate of penetration of the shoulder 32 into the sheet is moreover less than the rate of penetration of the pin 31 into the welded part 17.

The third step of separation of the welded part 17 and the sheet 33 of filler metal has the object, after the pressure on the shoulder 32 has been stopped, when the pin is removed from the top of the part, of breaking any metal bridges that may have been formed during the step of welding by the residues of plasticized metal that have passed into the interface between the sheet 33 and the welded part 17, notably when, with the pin 31 completely removed, the trench made in the welded part has been completely filled, as illustrated in FIG. 5.

The separation is realized such that it leaves in place the filler metal amalgamated by welding with the metal of the welded part 17.

Generally, because the pressure exerted on the shoulder 32 is maintained up to the end of the welding step, it is advantageously relatively easy to separate the welded part 17 from the part of the sheet 33 that is not used to repair the defect in question by applying a pulling force or shearing force for example.

Next, according to an embodiment that is preferred, but not otherwise exclusive, the separation of the welded part 17 and the sheet 33 of filler metal is carried out at the end of execution of the welding step, by imparting a lateral movement on the sheet of filler metal in the plane of the part before the rotation of the tool stops.

Although carried out so as to best repair the welding defect in question, by restoring a surface state to the welded part 17 that is as close as possible to the general surface state of said part, it is nevertheless possible for the surface of the welded parts to have irregularities in the region of the repair to the defect in question, it being possible for the appearance of said irregularities notably to follow the execution of the phase of separating the part 17 from the sheet 33.

For this reason, in a particular embodiment, the method according to the invention comprises a fourth step of renewing the surface state of the welded part 17 (repeat machining or resurfacing) in particular at the reworked region.

As is apparent from reading the above description, the implementation of the method according to the invention involves the use of a friction stir welding tool having a retractable pin. Use is preferably made here of a tool having a cylindrical pin, the diameter of which is slightly greater than that of the hole or trench to be filled. Likewise preferably, the shoulder 32 of the tool has a diameter of around one and a half to three times that of the pin 31.

Furthermore, the thickness of the sheet 33 of filler metal is preferably less than that of the welded part 17. Thus, as the case may be, the thickness of the sheet 33 is around ¼ to ⅔ of the thickness of the welded part 17.

The filler metal is moreover preferably identical to that constituting the part 17.

From the point of view of the implementation of the method according to the invention, it should be noted that the sheet of filler metal should be prevented from rotating while it is being put in place (first step of the method).

It should also be noted that the speeds of rotation and the forces for inserting the pin 31 and the shoulder 32, which forces may be different for the pin and for the shoulder, depend on the material constituting the welded part 17, on its thickness, on the dimensions of the hole to be filled and on the welding tool. This adjustment of the speeds of rotation, and of the speeds of insertion, resembles the traditional adjustments which are carried out for stir welding and which depend on the welding case.

Thus, it is clear from the above description that the implementation of the method according to the invention only provides movements of the tool (pin 31 and shoulder 32) that are perpendicular to the surface of the welded part 17.

Nevertheless, in one particular embodiment, it is possible to provide a relative lateral movement of the tool, an orbital movement for example. Such a movement would advantageously make it possible to repair defects of different sizes by means of a single tool having dimensions that are nominally tailored to defects of a given size.

The invention claimed is:

1. A method for reworking a defect affecting a weld, comprising the steps of:
    placing a sheet of a filler metal in a region of the defect, the sheet of the filler metal being placed on a surface of a welded part next to the region of the defect;
    locally welding the sheet of the filler metal to the welded part, the welding being carried out in the region of the defect with the aid of a friction stir welding tool comprising a retractable welding pin; and
    separating the welded part and the sheet of the filler metal to leave the filler metal in place in a manner amalgamated by welding with a metal of the welded part;
    wherein the step of separating is performed at the end of the locally welding step, by imparting a movement on the sheet of the filler metal in a plane of the welded part before a rotation of the friction stir welding tool stops.

2. The method according to claim 1, wherein the step of locally welding comprises the following successive steps of:
    setting the friction stir welding tool into rotation and putting the friction stir welding tool under a pressure;
    inserting the retractable welding pin progressively into the welded part while maintaining or increasing the pressure on a shoulder of the friction stir welding tool;
    progressively retracting the retractable welding pin while maintaining or increasing the pressure on the shoulder of the friction stir welding tool;
    stopping the pressure on the shoulder of the friction stir welding tool upon withdrawal of the retractable welding pin from a top of the welded part.

3. The method according to claim 2, wherein the step of inserting the retractable welding pin is accompanied by the step of inserting the shoulder of the friction stir welding tool at a movement rate slower than that of the retractable welding pin.

4. The method according to claim 2, wherein the step of inserting the retractable welding pin is accompanied by a continuous orbital movement of the retractable welding pin.

5. The method according to claim 1, further comprising the step of renewing a surface state of the welded part in the region of the defect.

* * * * *